US011758034B2

(12) United States Patent
Nonaka

(10) Patent No.: US 11,758,034 B2
(45) Date of Patent: Sep. 12, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Hiroshige Nonaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 235 days.

(21) Appl. No.: 17/306,242

(22) Filed: May 3, 2021

(65) Prior Publication Data

US 2022/0201111 A1    Jun. 23, 2022

(30) Foreign Application Priority Data

Dec. 17, 2020   (JP) ................. 2020-209616

(51) Int. Cl.
*H04M 1/275* (2006.01)
*H04M 1/27467* (2020.01)
*H04M 1/27457* (2020.01)

(52) U.S. Cl.
CPC ....... *H04M 1/275* (2013.01); *H04M 1/27457* (2020.01); *H04M 1/27467* (2020.01); *H04M 2201/42* (2013.01)

(58) Field of Classification Search
CPC ............ H04M 1/0297; H04M 1/0295; H04M 1/72412; H04M 1/0202; H04M 1/04; G06F 16/20; G06F 16/23; G06F 16/27; G06F 16/2379; G06F 16/2393
See application file for complete search history.

(56) References Cited

U.S. PATENT DOCUMENTS

| | | | |
|---|---|---|---|
| 9,298,762 B2* | 3/2016 | Smarr ................ G06F 16/23 |
| 2005/0091284 A1* | 4/2005 | Weissman ............ G06F 16/27 |
| 2011/0047478 A1* | 2/2011 | Ellsworth ........... H04M 7/0057 |
| | | | 715/744 |
| 2011/0113073 A1* | 5/2011 | Chang ................ G06F 16/20 |
| | | | 707/E17.005 |
| 2013/0218902 A1* | 8/2013 | Vendrow ........... G06F 16/9535 |
| | | | 707/E17.014 |
| 2014/0156760 A1* | 6/2014 | Zheng ................ G06F 16/9535 |
| | | | 707/738 |
| 2018/0270307 A1* | 9/2018 | Yamada ............ G06F 16/2379 |

FOREIGN PATENT DOCUMENTS

| | | |
|---|---|---|
| JP | 2004-086800 A | 3/2004 |
| JP | 2012-123573 A | 6/2012 |

* cited by examiner

*Primary Examiner* — Yuwen Pan
*Assistant Examiner* — Angelica Perez
(74) *Attorney, Agent, or Firm* — Oliff PLC

(57) ABSTRACT

An information processing apparatus includes: a processors configured to: acquire a first address list stored in an external apparatus; and when synchronizing the acquired first address list and a second address list stored in the own apparatus, display a third address list in which information duplicated between the first address list and the second address list have been consolidated.

9 Claims, 10 Drawing Sheets

THIRD ADDRESS LIST

| IDENTIFICATION INFORMATION | ADDRESS NAME | ORGANIZATION NAME | SERVICE | CONTACT INFORMATION | UPDATE TIME | APPLIED RULE | CONSOLIDATION INFORMATION | |
|---|---|---|---|---|---|---|---|---|
| Identifier A | Taro Fuji | Fuji Co., Ltd. | FAX | 000-000 | 2020/2/1 9:00 | Rule 2 | None | · · |
| Identifier B | John Smith | Fuji Inc. | FAX | 222-222 | 2020/3/1 9:00 | Rule 1 | None | · · |
| | | | EMAIL | JSmith@fuji.com | 2020/4/1 9:00 | None | None | · · |
| Identifier C | Jim Richardson | PRI Corp. | EMAIL | JRichardson@pri.com | 2019/3/1 14:00 | None | None | · · |
| | | | EMAIL | JRichardson@pub.com | 2019/5/1 14:00 | Rule 3 | Identifier E | · · |
| | | | SMB | 192.168.0.1 | 2019/3/1 14:00 | None | None | · · |
| Identifier D | Phil Moss | Magna Inc. | FAX | 123-456 | 2020/5/1 15:00 | Rule 4 | None | · · |
| Identifier F | Neel Paris | Magna Inc. | | | 2019/11/1 8:00 | | None | · · |
| Identifier G | Hanako Fuji | None | EMAIL | hanako@pub.com | 2019/11/1 10:00 | Rule 5 | None | · · |
| · | · | · | · | · | · | · | · | · · |

FIG. 2

ADDRESS DATABASE

| IDENTIFICATION INFORMATION | ADDRESS NAME (PERSONAL NAME) | ORGANIZATION NAME | SERVICE | CONTACT INFORMATION (ADDRESS INFORMATION) | UPDATE TIME | APPLIED RULE | CONSOLIDATION INFORMATION | ... |
|---|---|---|---|---|---|---|---|---|
| Identifier A | Taro Fuji | Fuji Co., Ltd. | FAX | 111-111 | 2020/1/1 9:00 | Rule 1 | None | ... |
| Identifier B | John Smith | Fuji Inc. | FAX | 222-222 | 2020/3/1 9:00 | None | None | ... |
|  |  |  | EMAIL | JSmith@fuji.com | 2020/4/1 9:00 | Rule 3 | Identifier D | ... |
| Identifier C | Jim Richardson | PRI Corp. | EMAIL | JRichardson@pri.com | 2019/3/1 14:00 | None | None | ... |
|  |  |  | SMB | 192.168.0.1 | 2019/3/1 14:00 | None | None | ... |
|  |  |  | FAX | 333-333 | 2019/3/1 14:00 | None | None | ... |
| ... | ... |  | ... | ... | ... | ... | ... | ... |

FIG. 3

GROUP ADDRESS DATABASE

| IDENTIFICATION INFORMATION | ADDRESS NAME (GROUP NAME) | SERVICE | CONTACT INFORMATION (MEMBERS) | UPDATE TIME | APPLIED RULE | CONSOLIDATION INFORMATION | ... |
|---|---|---|---|---|---|---|---|
| Identifier E | FAX Group 1 | FAX | Identifier A, Identifier B, ... | 2019/12/1 9:00 | Rule 2 | None | ... |
| Identifier F | MULTI Group 1 | MULTI | Identifier C, Identifier D, ... | 2019/12/1 7:00 | None | None | ... |
| Identifier G | IP Dept Group 1 | EMAIL | Identifier B, Identifier C, ... | 2020/5/1 8:00 | Rule 5 | None | ... |
| ... | ... | | | | | | |

FIG. 5A

FIRST ADDRESS LIST

| IDENTIFICATION INFORMATION | ADDRESS NAME | ORGANIZATION NAME | SERVICE | CONTACT INFORMATION | UPDATE TIME | ... |
|---|---|---|---|---|---|---|
| Identifier A | Taro Fuji | Fuji Co., Ltd. | FAX | 000-000 | 2020/2/1 9:00 | ... |
| Identifier B | John Smith | Fuji Inc. | FAX | 222-222 | 2020/3/1 9:00 | ... |
| Identifier E | Jim Richardson | PRI Corp. | EMAIL | JRichardson@pub.com | 2019/5/1 14:00 | ... |
| Identifier F | Neel Paris | Magna Inc. | FAX | 123-456 | 2019/11/1 8:00 | ... |
| Identifier G | Hanako Fuji | None | EMAIL | hanako@pub.com | 2019/11/1 10:00 | ... |

SECOND ADDRESS LIST

| IDENTIFICATION INFORMATION | ADDRESS NAME | ORGANIZATION NAME | SERVICE | CONTACT INFORMATION | UPDATE TIME | ... |
|---|---|---|---|---|---|---|
| Identifier A | Taro Fuji | Fuji Co., Ltd. | FAX | 111-111 | 2020/1/1 9:00 | ... |
| Identifier B | John Smith | Fuji Inc. | FAX | 222-222 | 2020/3/1 9:00 | ... |
| | | | EMAIL | JSmith@fuji.com | 2020/4/1 9:00 | ... |
| Identifier C | Jim Richardson | PRI Corp. | EMAIL | JRichardson@pri.com | 2019/3/1 14:00 | ... |
| | | | SMB | 192.168.0.1 | 2019/3/1 14:00 | ... |
| Identifier D | Phil Moss | Magna Inc. | FAX | 123-456 | 2020/5/1 15:00 | ... |

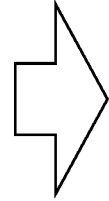

FIG. 5B

THIRD ADDRESS LIST

| IDENTIFICATION INFORMATION | ADDRESS NAME | ORGANIZATION NAME | SERVICE | CONTACT INFORMATION | UPDATE TIME | APPLIED RULE | CONSOLIDATION INFORMATION | ... |
|---|---|---|---|---|---|---|---|---|
| Identifier A | Taro Fuji | Fuji Co., Ltd. | FAX | 000-000 | 2020/2/1 9:00 | Rule 2 | None | ... |
| | | | FAX | 222-222 | 2020/3/1 9:00 | Rule 1 | None | ... |
| Identifier B | John Smith | Fuji Inc. | EMAIL | JSmith@fuji.com | 2020/4/1 9:00 | None | None | ... |
| Identifier C | Jim Richardson | PRI Corp. | EMAIL | JRichardson@pri.com | 2019/3/1 14:00 | None | None | ... |
| | | | EMAIL | JRichardson@pub.com | 2019/5/1 14:00 | Rule 3 | Identifier E | ... |
| | | | SMB | 192.168.0.1 | 2019/3/1 14:00 | None | None | ... |
| Identifier D | Phil Moss | Magna Inc. | FAX | 123-456 | 2020/5/1 15:00 | Rule 4 | None | ... |
| Identifier F | Neel Paris | Magna Inc. | | | 2019/11/1 8:00 | | None | ... |
| Identifier G | Hanako Fuji | None | EMAIL | hanako@pub.com | 2019/11/1 10:00 | Rule 5 | None | ... |
| ... | ... | ... | ... | ... | ... | ... | ... | ... |

FIG. 6

ADDRESS DATABASE

| IDENTIFICATION INFORMATION | ADDRESS NAME (PERSONAL NAME) | ORGANIZATION NAME | SERVICE | CONTACT INFORMATION (ADDRESS INFORMATION) | UPDATE TIME | APPLIED RULE | ... |
|---|---|---|---|---|---|---|---|
| Identifier A | Taro Fuji | Fuji Co., Ltd. | FAX | 111-111 | 2020/1/1 9:00 | Rule 1 | ... |
| Identifier B | John Smith | Fuji Inc. | FAX | 222-222 | 2020/3/1 9:00 | None | ... |
|  |  |  | EMAIL | JSmith@fuji.com | 2020/4/1 9:00 | Rule 3 | ... |
| Identifier C | Jim Richardson | PRI Corp. | EMAIL | JRichardson@pri.com | 2019/3/1 14:00 | None | ... |
|  |  |  | SMB | 192.168.0.1 | 2019/3/1 14:00 | None | ... |
|  |  |  | FAX | 333-333 | 2019/3/1 14:00 | None | ... |
| ... | ... | ... | ... | ... | ... | ... | ... |

FIG. 7

GROUP ADDRESS DATABASE

| IDENTIFICATION INFORMATION | ADDRESS NAME (GROUP NAME) | SERVICE | CONTACT INFORMATION (MEMBERS) | UPDATE TIME | APPLIED RULE | . . |
|---|---|---|---|---|---|---|
| Identifier E | FAX Group 1 | FAX | Identifier A, Identifier B, ... | 2019/12/1 9:00 | Rule 2 | . . |
| Identifier F | MULTI Group 1 | MULTI | Identifier C, Identifier D, ... | 2019/12/1 7:00 | None | . . |
| Identifier G | IP Dept Group 1 | EMAIL | Identifier B, Identifier C, ... | 2020/5/1 8:00 | Rule 5 | . . |
| . . | . . | . . | . . | . . | . . | . . |

FIG. 9

FIRST ADDRESS LIST

| IDENTIFICATION INFORMATION | ADDRESS NAME | ORGANIZATION NAME | SERVICE | CONTACT INFORMATION | UPDATE TIME | APPLIED RULE | ... |
|---|---|---|---|---|---|---|---|
| Identifier E | Jim Richardson | PRI Corp. | EMAIL | JRichardson@pub.com | 2019/5/1 14:00 | None | ... |
| . | . | . | . | . | . | . | . |

SECOND ADDRESS LIST

| IDENTIFICATION INFORMATION | ADDRESS NAME | ORGANIZATION NAME | SERVICE | CONTACT INFORMATION | UPDATE TIME | APPLIED RULE | ... |
|---|---|---|---|---|---|---|---|
| Identifier C | Jim Richardson | PRI Corp. | EMAIL | JRichardson@pri.com | 2019/3/1 14:00 | Rule 1 | ... |
|  |  |  | SMB | 192.168.0.1 | 2019/3/1 14:00 | None | ... |
| . | . | . | . | . | . | . | . |

THIRD ADDRESS LIST

| IDENTIFICATION INFORMATION | ADDRESS NAME | ORGANIZATION NAME | SERVICE | CONTACT INFORMATION | UPDATE TIME | APPLIED RULE | ... |
|---|---|---|---|---|---|---|---|
| Identifier H | Jim Richardson | PRI Corp. | EMAIL | JRichardson@pri.com | 2019/3/1 14:00 | None | ... |
|  |  |  | EMAIL | JRichardson@pub.com | 2019/5/1 14:00 | Rule 3 | ... |
|  |  |  | SMB | 192.168.0.1 | 2019/3/1 14:00 | None | ... |
| . | . | . | . | . | . | . | . |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-209616 filed Dec. 17, 2020.

BACKGROUND

(i) Technical Field

The present disclosure relates to an information processing apparatus and a non-transitory computer readable medium.

(ii) Related Art

JP-A-2004-086800 discloses a data synchronization system including a client having a first database, and a server. This server is connected to the client over a network. The server includes a second database and an update history saving unit that saves updated contents of the second database as an update history. The server includes a storage that stores a first threshold which when the number of update histories which are to be transmitted to the client that and which has been saved in the update history saving unit reaches, data synchronization starts. The server extracts the update histories to be transmitted to the client from the update history saving unit, and if the number of extracted update histories is larger than the first threshold, starts data synchronization between the first database and the second database.

JP-A-2012-123573 discloses a network synchronization system including plural information processing apparatuses. User information that each of the plural information processing apparatuses has is synchronized and shared by the plural information processing apparatuses. Each information processing apparatus includes a user information storage that stores the user information of the own apparatus, and a user data storage that stores user data that exists in association with each user information of the own apparatus. The information processing apparatus includes a sharing storage for synchronization. The sharing storage copies and stores the user information of the own apparatus which is stored in the user information storage. The sharing storage shares the copied user information of the own apparatus with the information processing apparatuses other than the own apparatus. The information processing apparatus includes a synchronization controller that synchronizes with the other information processing apparatuses and updates the user information of the own apparatus stored in the sharing storage for synchronization to the latest user information, based on a comparison between (i) the user information of the own apparatus stored in the sharing storage for synchronization and (ii) the user information of the other information processing apparatuses. The synchronization controller updates the user information of the user information storage based on the latest user information. When the user information of the own apparatus is deleted in updating, if the user data associated with the user information to be deleted is stored in the user data storage, the synchronization controller executes a predetermined process.

SUMMARY

For example, an information processing apparatus synchronizes address lists stored in external apparatuses and uses the synchronized address lists as an address list stored in the own apparatus. If the address lists to be synchronized include fully or partially duplicate information and the duplicate information are added as they are, the information processing apparatus possibly displays the duplicate information plural times.

Aspects of non-limiting embodiments of the present disclosure relate to preventing duplicate information from being displayed plural times when plural address lists are synchronized.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processors configured to: acquire a first address list stored in an external apparatus; and when synchronizing the acquired first address list and a second address list stored in the own apparatus, display a third address list in which information duplicated between the first address list and the second address list have been consolidated.

BRIEF DESCRIPTION OF THE DRAWINGS

Exemplary embodiment(s) of the present disclosure will be described in detail based on the following figures, wherein:

FIG. 2 is a schematic diagram illustrating an example of a structure of an address database according to a first exemplary embodiment;

FIG. 3 is a schematic diagram illustrating an example of a structure of a group address database according to the first exemplary embodiment;

FIGS. 5A and 5B are schematic diagrams illustrating a third address list displayed by the information processing according to the first exemplary embodiment;

FIG. 6 is a schematic diagram illustrating an example of a structure of an address database according to a second exemplary embodiment;

FIG. 7 is a schematic diagram illustrating an example of a structure of a group address database according to the second exemplary embodiment;

FIG. 9 is a schematic diagram illustrating a third address list displayed by the information processing according to the second exemplary embodiment.

DETAILED DESCRIPTION

Figure 1:
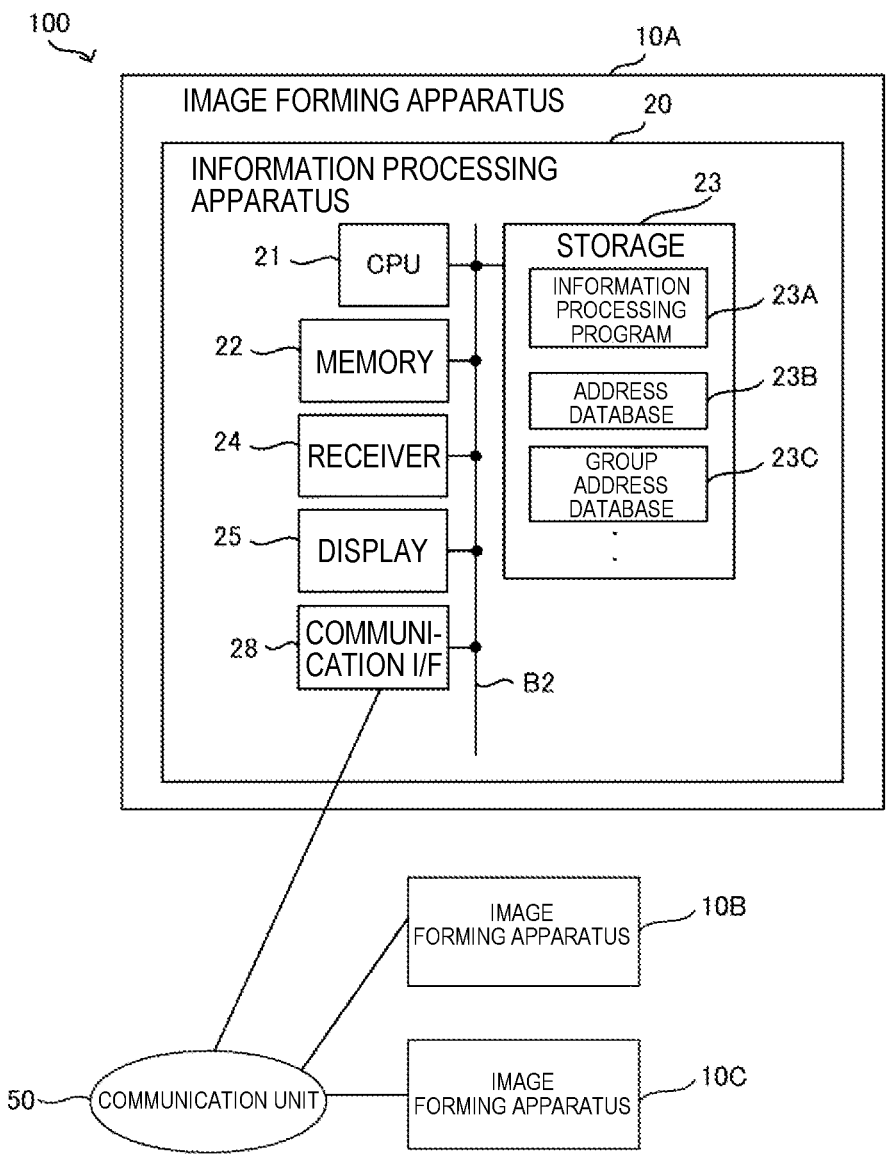
FIG. 1 is a block diagram illustrating an example of a configuration of an information processing apparatus according to an exemplary embodiment.

Hereinafter, an example of exemplary embodiments of the present disclosure will be described with reference to the accompanying drawings. The same reference numerals are allocated to the same or equivalent elements and parts in drawing. Dimensional ratios in the drawings may be exaggerated for the convenience of descriptions, and may differ from actual ratios.

FIG. 1 is a block diagram illustrating an example of a hardware configuration of an information processing system according to the present exemplary embodiment.

As illustrated in FIG. 1, an information processing system 100 according to the present exemplary embodiment includes plural image forming apparatuses 10A, 10B, and . . . each of which can access a communication unit 50. Hereinafter, when the image forming apparatuses 10A, 10B, . . . are described without distinction, the image forming apparatuses 10A, 10B, . . . will be simply and collectively referred to as an "image forming apparatus 10".

In the present exemplary embodiment, an apparatus of the present disclosure is an image forming apparatus 10 having an image printing function, an image reading function, and an image transmission function. However, the apparatus of the present disclosure may be an image forming apparatus simply having the image transmission function and the image reading function, or an apparatus such as a smartphone. In the present exemplary embodiment, the present disclosure is applied to a case in which information stored in the respective plural image forming apparatuses 10 are integrated, particularly to a case in which a user of the image forming apparatus 10 (hereinafter, which may be simply referred to as a "user") utilizes the integrated information to carry out an operation. However, the present disclosure may be applied to a case in which the user possesses plural smartphones and wants to integrate address books stored in the respective smartphones.

The image forming apparatus 10 according to the present exemplary embodiment includes an information processing apparatus 20. In the present exemplary embodiment, what will be described is an example in which the image forming apparatus 10 and the information processing apparatus 20 are integrated. It is noted that the image forming apparatus 10 and the information processing apparatus 20 may be separated. The information processing apparatus 20 according to the present exemplary embodiment includes a CPU 21, a memory 22 as a temporary storage area, a non-volatile storage 23, a receiver 24, a display 25, and a communication I/F 28. The respective units are connected to each other over a bus B2.

The storage 23 is implemented by a storage device such as an HDD, an SSD, or a flash memory. The storage 23 as a storage medium stores an information processing program 23A. The CPU 21 reads the information processing program 23A from the storage 23, loads the information processing program 23A onto the memory 22, and sequentially executes processes included in the information processing program 23A. The storage 23 stores various databases such as an address database 23B and a group address database 23C. Details of the databases will be described later.

The receiver 24 includes a pointing device (such as a mouse) and a keyboard. The receiver 24 is used to receive various input information.

The display 25 is, for example, a liquid crystal display, and displays various information. The display 25 may include a touch panel to serve as the receiver 24.

The communication I/F 28 is an interface using which the information processing apparatus 20 communicates with an external image forming apparatus 10 (hereinafter, referred to as an "external apparatus"). For the communication, for example, wired communication standards such as Ethernet (registered trademark) or FDDI are used.

The image forming apparatus 10 according to the present exemplary embodiment includes an image forming unit, an image reader, an image transmitter, and a sheet feeding unit that feeds recording sheets, but description on those units and illustration of those units will be omitted.

Next, the address database 23B according to the present exemplary embodiment will be described with reference to FIG. 2. As illustrated in FIG. 2, plural pieces of address data are stored in the address database 23B according to the present exemplary embodiment. In FIG. 2, each row represents address data. Each address data is associated with respective information, that is, identification information, an address name, an organization name, a service, contact information, an update time, an applied rule, and consolidation information.

The identification information is information uniquely assigned to each address to identify the address which the information processing apparatus 20 contacts. In the present exemplary embodiment, the identification information is an identifier such as a universally unique identifier (UUID). The address name is information that represents a name of the address corresponding to the identification information and that represents a name of an individual. However, the address name may be information representing a family name, a last name, a middle name, ruby characters, or a nickname. The organization name is information that represents a name of an organization to which the corresponding address name belongs. In the present exemplary embodiment, the organization name is a name of a company to which the corresponding address name belongs. However, the organization name may be a name of a department to which the corresponding address name belongs or a name of an occupation of the corresponding address name.

The service is information that represents a service that is used to contact the corresponding address name. In the present exemplary embodiment, the services are a facsimile service (in the example illustrated in FIG. 2, "FAX"), an e-mail service (in the example illustrated in FIG. 2, "EMAIL"), and a server message block (SMB) service. However, the services may include a telephone service. Also, the service may be a single service or a combination of plural services. The contact information is address information that is used to contact the corresponding address name with the corresponding service. In the present exemplary embodiment, the contact information include a facsimile number, an e-mail address, and an Internet Protocol (IP) address. However, the contact information may be a user name or a domain name in the e-mail address or a telephone number. Also, the contact information may be a single piece of contact information or a combination of plural pieces of communication information. The update time is information that represents a date and time at which any of the corresponding identification information, address name, organization name, service and contact information was updated.

The applied rule is information that represents a rule applied when the address database 23B stored in the own apparatus was synchronized. The consolidation information is identification information before the identification information was consolidated in the address database 23B stored in the own apparatus. The consolidation information include an identification (ID) for identifying an external apparatus in which address data in interest had been stored before the address database 23B stored in the own apparatus was synchronized.

In the example illustrated in FIG. 2, two pieces of address data corresponding to an identifier B and corresponding to John Smith who belongs to Fuji Inc. are stored. One of the two pieces of address data represents that it was updated at 9:00 on Mar. 1, 2020, that a facsimile number is 222-222, and that it is not address data synchronized with the address database 23B of the own apparatus. The other of the two pieces of address data represents that it was updated at 9:00 on Apr. 1, 2020, and that an e-mail address is JSmith@fuji.com. The other of the two pieces of address data also represents that it is address data that has been synchronized with the address database 23B of the own apparatus with a rule 3 applied, and that identification information before identification information were consolidated was an identifier D.

Next, the group address database 23C according to the present exemplary embodiment will be described with reference to FIG. 3. As illustrated in FIG. 3, the group address database 23C according to the present exemplary embodiment is different from the address database 23B in that a name of a group is stored in the address name rather than the name of the individual, and that no organization name is stored. The group address database 23C according to the present exemplary embodiment is also different from the address database 23B in that a service that is a combination of plural services such as a combination of a telephone service and an e-mail service may be applied (in the example illustrated in FIG. 3, "MULTI").

Furthermore, the group address database 23C according to the present exemplary embodiment is different from the address database 23B in that members are stored in the contact information rather than the address information. Specifically, the contact information stored in the group address database 23C is information that represents members who belong to the corresponding group. In the present exemplary embodiment, the contact information is the identification information which correspond to the members and which are stored in the address database 23B. Accordingly, the address database 23B and the group address database 23C are related to each other. Thus, when information stored in the address database 23B is changed, information stored in the group address database 23C is also changed to follow the change of the information stored in the address database 23B. However, the contact information may be information representing address information which are used to contact the members. In this case, even if information stored in the address database 23B is changed, information stored in the group address database 23C is not changed in accordance with the change of the information stored in the address database 23B.

Figure 4:
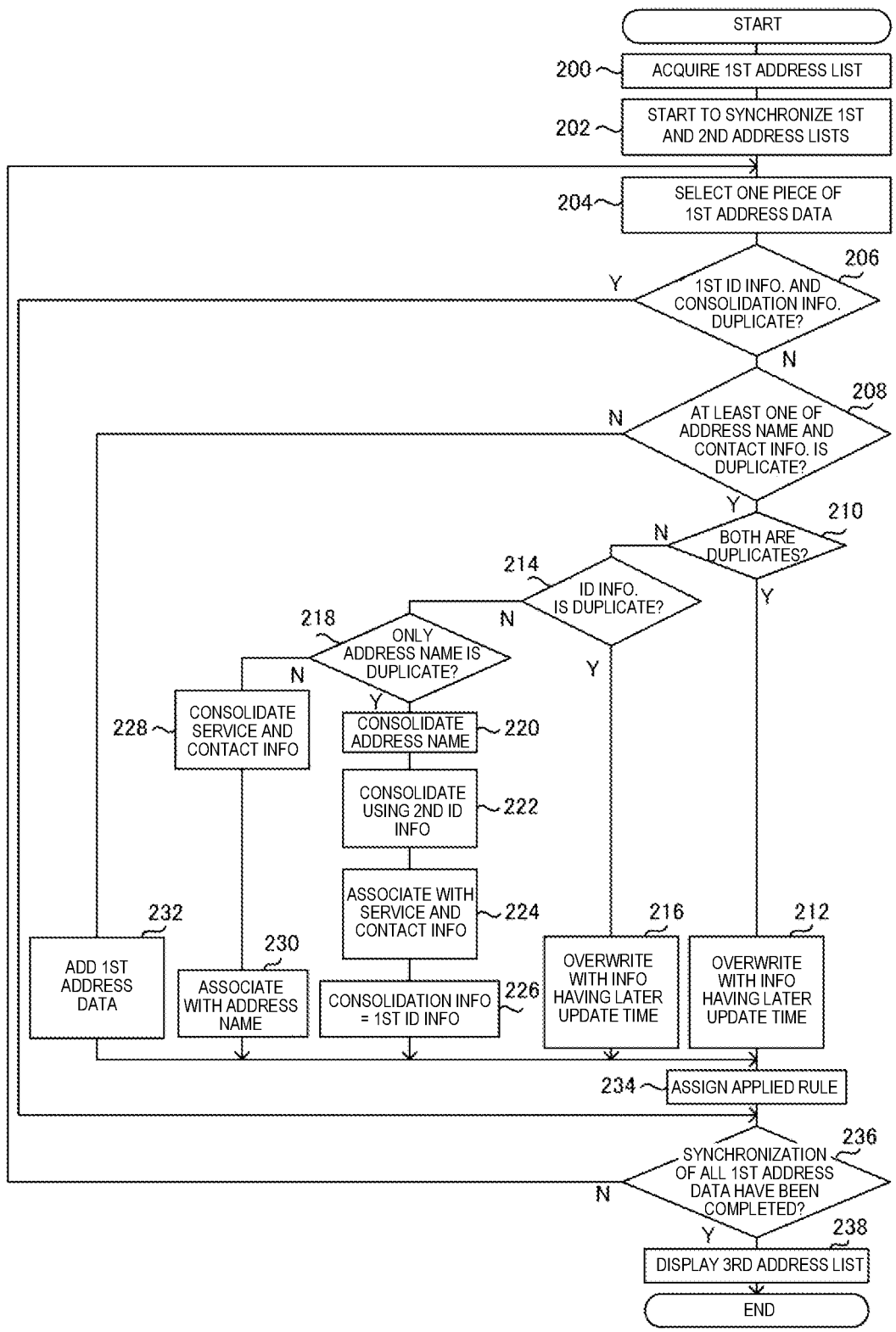
FIG. 4 is a flowchart of an example of information processing according to the first exemplary embodiment.

Next, an operation of the information processing apparatus 20 according to the present exemplary embodiment will be described with reference to FIG. 4. In response to the user instructing the information processing apparatus 20 to execute information processing, the CPU 21 executes the information processing program 23A, so that the information processing illustrated in FIG. 4 is executed. However, the CPU 21 may execute the information processing at intervals that are determined by an administrator of the image forming apparatus (hereinafter who is simply referred to as an "administrator") in advance or the CPU 21 may execute the information processing when a remaining storage capacity of the storage 23 is equal to or less than a threshold value. Alternatively, the CPU 21 may execute the information processing illustrated in FIG. 4 in response to the administrator giving an instruction to perform synchronization between the image forming apparatuses 10.

In step 200, the CPU 21 acquires a first address list. Specifically, the CPU 21 acquires the address database 23B stored in an external apparatus via the communication I/F 28. In the present exemplary embodiment, the external apparatus is an external apparatus designated by the user. However, the external apparatus may be an external apparatus that is determined by the administrator in advance, or an external apparatus that is closest to the own apparatus.

In step 202, the CPU 21 starts to synchronize the first address list and a second address list. Specifically, the CPU 21 reads the second address list that is the address database 23B stored in the storage 23 of the own apparatus, and starts to synchronize the first address list and the second address list.

In the present exemplary embodiment, the number of external apparatuses is one. However, the number of external apparatuses may be two or more. In this case, the CPU 21 may receive from the user an order in which the plural first address lists acquired at step 200 are to be synchronized with the second address list and synchronize the first address lists with the second address list in the received order. Alternatively, the CPU 21 may synchronize the first address lists with the second address list in an order of distances between the external apparatuses and the own apparatus from the shortest distance to the longest distance.

In step 204, the CPU 21 selects one of pieces of first address data which are the address data stored in the first address list. In the present exemplary embodiment, an order in which the CPU 21 selects the pieces of the first address data from the first address list is an order in which the pieces of the first address data were stored in the first address list. However, the order in which the CPU 21 selects the pieces of the first address data from the first address list may be (i) an order reverse to the order in which the pieces of the first address data were stored in the first address list or (ii) an ascending order of the identification information. In the following description, the piece of first address data selected in step S204 is simply referred to as "first address data".

In step 206, the CPU 21 determines whether the second address list includes a piece of address data in which information that is a duplicate of identification information in the first address data (hereinafter, which will be referred to as "first identification information") is stored as consolidation information. In other words, the CPU 21 determines whether the first address data includes a synchronization history which represents that the first address data has been synchronized with the second address list. In the following description, each of the pieces of address data included in the second address list will be referred to as "second address data". If an affirmative determination is made in the process in step 206, the CPU 21 proceeds to step 236. If a negative determination is made in the process in step 206, the CPU 21 proceeds to step 208.

In step 208, the CPU 21 determines whether there is a piece of second address data including at least one of (i) a duplicate of the address name in the first address data (hereinafter, which will be referred to as a "first address name") or (ii) a duplicate of the contact information in the first address data (hereinafter, which will be referred to as "first contact information"). If an affirmative determination is made in the process in step 208, the CPU 21 proceeds to step 210.

In step 210, the CPU 21 determines whether there is a piece of second address data including both the duplicate of the first address name and the duplicate of the first contact information (hereinafter, which will be referred to as "address/contact duplicate data"). If an affirmative determination is made in the process in step 210, the CPU 21 proceeds to step 212. If a negative determination is made in the process in step 210, the CPU 21 proceeds to step 214.

In step 212, the CPU 21 overwrites address data having an earlier update time among the first address data and the address/contact duplicate data with the address data having the later update time. Specifically, if an update time of the first address data is later than that of the address/contact duplicate data, the CPU 21 overwrites the address/contact duplicate data with the first address data. On the other hand, if the update time of the first address data is earlier than that of the address/contact duplicate data, the CPU 21 does not perform any process on the address/contact duplicate data. Alternatively, the CPU 21 may overwrite the address data having the later update time among the first address data and the address/contact duplicate data with the address data having the earlier update time. The CPU 21 may not perform any process on the address/contact duplicate data irrespective of the update time or may overwrite the address/contact duplicate data with the first address data irrespective of the update time. Furthermore, if information has been stored in at least one of (i) the applied rule or (ii) the consolidation information in the address/contact duplicate data, the CPU 21 deletes these information.

In step 214, the CPU 21 determines whether there is a piece of second address data including identification information that is the duplicate of the first identification information (hereinafter, which will be referred to as "identification duplicate data"). If an affirmative determination is made in the process in step 214, the CPU 21 proceeds to step 216. If a negative determination is made in the process in step 214, the CPU 21 proceeds to step 218.

In step 216, the CPU 21 overwrites address data having an earlier update time among the first address data and the identification duplicate data with the address data having the later update time. Specifically, if the update time of the first address data is later than that of the identification duplicate data, the CPU 21 overwrites the identification duplicate data with the first address data. On the other hand, if the update time of the first address data is earlier than that of the identification duplicate data, the CPU 21 does not perform any process on the identification duplicate data. Alternatively, the CPU 21 may overwrite the address data having the later update time among the first address data and the identification duplicate data with the address data having the earlier update time. The CPU 21 may not perform any process on the identification duplicate data irrespective of the update time or may overwrite the identification duplicate data with the first address data irrespective of the update time. Furthermore, if information has been stored in at least one of (i) the applied rule or (ii) the consolidation information in the identification duplicate data, the CPU 21 deletes these information.

In step 218, the CPU 21 determines whether there is a piece of second address data including an address name that is the duplicate of the first address name, but not including contact information that is the duplicate of the first contact information (hereinafter, which will be referred to as "address duplicate data"). If an affirmative determination is made in the process in step 218, the CPU 21 proceeds to step 220.

In step 220, the CPU 21 consolidates the first address name into the address name in the address duplicate data.

In step 222, the CPU 21 consolidates the identification information using the identification information in the address duplicate data (hereinafter, which will be referred to as "second identification information"). Specifically, the CPU 21 changes the first identification information to the second identification information, and then consolidates the first identification information into the second identification information. The CPU 21 may consolidate the second identification information using the first identification information.

In step 224, the CPU 21 associates the address duplicate data into which the address name and the identification information have been consolidated, with the service and the contact information in the first address data. In the step S224, the CPU 21 may further associate the address duplicate data with at least one of the organization name in the first address data or the update time in the first address data. If the organization name in the first address data is a duplicate of the organization name in the address duplicate data, the CPU 21 may consolidate the organization name into the address duplicate data. If the update time in the first address data is a duplicate of the update time in the address duplicate data, the CPU 21 may consolidate the update time into the address duplicate data.

In step 226, the CPU 21 overwrites consolidation information in the address data, with which the service and the contact information have been associated in step 224, with the first identification information.

On the other hand, if a negative determination is made in the process in step 218, the CPU 21 proceeds to step 228. In other words, if there is a piece of second address data including contact information that is the duplicate of the first contact information, but not including an address name that is the duplicate of the first address name (hereinafter, which will be referred to as "contact duplicate data"), the CPU 21 proceeds to step 228. In step 228, the CPU 21 consolidates the service and the contact information in the first address data into the service and the contact information in the contact duplicate data. In the present exemplary embodiment, it is assumed that if the contact information in the second address data is the duplicate of the first contact information, the service in the second address data is the duplicate of the service in the first address data.

In step 230, the CPU 21 associates the contact duplicate data into which the service and the contact information have been consolidated, with the first address name. In the step 230, the CPU 21 may further associate the contact duplicate data with at least one of the identification information, the organization name, or the update time in the first address data. If the organization name in the first address data is a duplicate of the organization name in the contact duplicate data, the CPU 21 may consolidate the organization name into the contact duplicate data. If the update time in the first address data is a duplicate of the update time in the contact duplicate data, the CPU 21 may consolidate the update time into the contact duplicate data.

On the other hand, if a negative determination is made in the process in step 208, the CPU 21 proceeds to step 232. In step 232, the CPU 21 adds the first address data to the second address list. If the negative determination is made in the process of step 208, the CPU 21 may proceed to step 236. In other words, if there is no piece of second address data including at least one of the duplicate of the first address name or the duplicate of the first contact information, the CPU 21 may not add the first address data to the second address list. In step 232, the CPU 21 may cause the external apparatus to delete the first address data from the first address list, via the communication I/F 28.

In step 234, the CPU 21 associates the consolidated address data with an applied rule based on predetermined conditions. Specifically, for example, the CPU 21 associates the address data that has been overwritten and consolidated by the process in step 212, with a rule 1 as the applied rule. The CPU 21 associates the address data that has been overwritten and consolidated by the process in step 216, with a rule 2 as the applied rule. The CPU 21 associates the address data which has been consolidated and associated with the service and the contact information by the process in step 224, with a rule 3 as the applied rule. The CPU 21 associates the address data which has been consolidated and associated with the address name and the process in step 230, with a rule 4 as the applied rule. The CPU 21 associates the address data added by the process in step 232 with a rule 5 as the applied rule.

The predetermined conditions may be conditions other than the conditions described above. For example, the CPU 21 may store the rule 1 in the applied rule in the address data which has been consolidated and associated with the service and the contact information by the process in step 224, and store the rule 2 in the applied rule in the address data added by process in step 232.

In step 236, the CPU 21 determines whether synchronization of all the pieces of first address data included in the first address list with the second address list has been completed. In other words, the CPU 21 determines whether the processes from steps 204 to 234 have been performed on all the pieces of first address data. If an affirmative determination is made in the process in step 236, the CPU 21 proceeds to step 238. If a negative determination is made in the process in step 236, the CPU 21 returns to step 204.

In step 238, the CPU 21 displays, on the display 25, the second address list as a third address list in which information that is duplicated between the first address list and the second address list have been consolidated, or enables the display 25 to display the second address list as the third address list, and ends the information processing. In the step S238, the user can use the third address list as the second address list. The CPU 21 may cause a display of the external apparatus to display the third address list via the communication I/F 28 or cause only the display of the external apparatus to display the third address list.

In the present exemplary embodiment, after the CPU 21 executes step 238, the CPU 21 stores the third address list in the storage 23 as the second address list. However, after the CPU 21 executes step 238, the CPU 21 may not store the third address list as the second address list. Alternatively, only when the CPU 21 receives from the user an instruction to store the third address list as the second address list, the CPU 21 may store the third address list in the storage 23 as the second address list.

In the present exemplary embodiment, the third address list is an address list generated by consolidating information that is duplicated between the first address list and the second address list into the second address list. However, the third address list may be an address list generated by consolidating the duplication of the information into the first address list. Furthermore, the CPU 21 may overwrite an address list that is one of the first address list and the second address list which has not been consolidated as the third address list, with the third address list. Alternatively, the CPU 21 may delete the address list that has not been consolidated as the third address list.

In the present exemplary embodiment, if the CPU 21 determines that there is information duplicated between the first address data and the second address data, the CPU 21 immediately executes the consolidation. However, the CPU 21 may execute the consolidation only when receiving an instruction to execute the consolidation. The CPU 21 may receive a designation of a method of consolidating the duplicate information together with the instruction to execute the consolidation, and may execute the consolidation using the designated method. In this case, for example, if there is address duplicate data and the CPU 21 receives an instruction to overwrite address data having an earlier update time with address data having a later update time, the CPU 21 executes the consolidation by overwriting the address data having the earlier update time with the address data having the later update time although the contact information and the like are not duplicate.

In the present exemplary embodiment, if there is address/contact duplicate data or identification duplicate data, the CPU 21 overwrites address data having an earlier update time with address data having a later update time. However, if there is address duplicate data or contact duplicate data, the CPU 21 may overwrite the address data having the earlier update time with the address data having the later update time. The CPU 21 may simply consolidate the first address name or the first contact information into the address name or the contact information in the address/contact duplicate data, or may simply consolidate the first identification information into the identification information in the identification duplicate data. Conditions for a combination of consolidation methods and priorities of combinations of consolidation methods may be stored for each external apparatus in the storage 23.

In the present exemplary embodiment, the first address list is the address database 23B stored in the external apparatus, and the second address list is the address database 23B stored in the own apparatus. However, the first address list may be the group address database 23C stored in the external apparatus, and the second address list may be the group address database 23C stored in the own apparatus. In this case, for example, if the CPU 21 is to determine whether contact information is duplicated between these address lists, the CPU 21 determines whether the identification information stored as the contact information is duplicated or whether the address information is duplicated. If the CPU 21 determines that the contact information is duplicated between these address lists, the CPU 21 consolidates the identification information, which has been stored as the contact information, or the address information.

In the present exemplary embodiment, if the first address name is exactly same as the address name in the second address data, the CPU 21 determines that the first address name and the address name in the second address data duplicate each other. However, if the first address name is partially same as the address name in the second address data, the CPU 21 may determine that the first address name and the address name in the second address data duplicate each other. Specifically, if at least one of the family names, the last names, or the middle names of these address names are the same, the CPU 21 may determine that the first address name and the address name in the second address data duplicate each other.

In the present exemplary embodiment, if the first contact information is exactly same as the contact information in the second address data, the CPU 21 determines that the first contact information and the contact information in the second address data duplicate each other. However, if the first contact information is partially same as the contact information in the second address data, the CPU 21 may determine that the first contact information and the contact information in the second address data duplicate each other. Specifically, if these contact information are facsimile numbers and n or more digits of the facsimile numbers match (where n is a predetermined integer), the CPU 21 may determine that the first contact information and the contact information in the second address data duplicate each other. If these contact information are e-mail addresses and only the user names or the domain names in the email addresses match, the CPU 21 may determine that the first contact information and the contact information in the second address data duplicate each other.

In the present exemplary embodiment, the CPU 21 does not determine whether a creator is duplicated between the first address data and the second address data. However, the CPU 21 may determine whether the creator is duplicated between the first address data and the second address data. If determining that the creator is duplicated between the first address data and the second address data, the CPU 21 may overwrite address data having an earlier update time with address data having a later update time.

Next, with reference to FIGS. 5A and 5B, the third address list will be specifically described. Here, it is assumed that the third address list is displayed using a first address list and a second address list which have not been synchronized with another address list before.

First, in an example of the first address list illustrated in FIG. 5A, first address data which has identification information of an identifier A, which corresponds to Taro Fuji who belongs to Fuji Co., Ltd, and which has contact information of "000-000" is stored. Meanwhile, in an example of the second address list illustrated in FIG. 5A, identification duplicate data which has the identification information of the identifier A, which corresponds to Taro Fuji who belongs to Fuji Co., Ltd, and which has contact information of "111-111" is stored.

In this case, the CPU 21 applies the rule 2 (step 214: Y), and overwrites address data having an earlier update time among the first address data and the identification duplicate data, with the address data having the later update time. In an example of the third address list illustrated in FIG. 5B, the CPU 21 displays address data which has been overwritten with the first address data having the update time of "2020/2/1 9:00", as address data having the identifier A.

Next, in the example of the first address list illustrated in FIG. 5A, first address data which has identification information of an identifier B, which corresponds to John Smith who belongs to Fuji Inc., and which has contact information of "222-222" is stored. Meanwhile, in the example of the second address list illustrated in FIG. 5A, address/contact duplicate data which has the identification information of the identifier B, which corresponds to John Smith who belongs to Fuji Inc., and which has the contact information of "222-222" is stored.

In this case, the CPU 21 applies the rule 1 (step 210: Y), and overwrites address data having an earlier update time among the first address data and the address/contact duplicate data, with the address data having the later update time. In the example of the third address list illustrated in FIG. 5B, since both the first address data and the address/contact duplicate data have the update time of "2020/3/1 9:00", the CPU 21 displays the address/contact duplicate data as address data having the identifier B as it is.

Next, in the example of the first address list illustrated in FIG. 5A, first address data which has identification information of an identifier E, which corresponds to Jim Richardson who belongs to PRI Corp, and which has contact information of "JRichardson@pub.com" is stored. Meanwhile, in the example of the second address list illustrated in FIG. 5A, address duplicate data which has identification information of an identifier C, which corresponds to Jim Richardson who belongs to PRI Corp, and which has contact information of "JRichardson@pri.com" is stored.

In this case, the CPU 21 applies the rule 3 (Step 218: Y), generates address data by consolidating an address name and identification information into the address duplicate data, associates the address data with services and the contact information, sets consolidation information of the address data to the identifier E, and then displays the address data. In the example of the third address list illustrated in FIG. 5B, the CPU 21 displays address data which has identification information of the identifier C, which corresponding to Jim Richardson who belongs to PRI Corp, and the contact information of "JRichardson@pub.com".

Next, in the example of the first address list illustrated in FIG. 5A, first address data which has identification information of an identifier F, which corresponds to Neel Paris who belongs to Magna Inc., and which has contact information of "123-456" is stored. Meanwhile, in the example of the second address list illustrated in FIG. 5A, contact duplicate data which has identification information of an identifier D, which corresponds to Phil Moss who belongs to Magna Inc., and which has contact information of "123-456" is stored.

In this case, the CPU 21 applies the rule 4 (Step 218: N), generates address data by consolidating the service and the contact information into the contact duplicate data, associates the address data with the address names, and then displays the address data. In the example of the third address list illustrated in FIG. 5B, the CPU 21 displays address data both of which have a service of "FAX" and the contact information of "123-456", which have the identification information of the identifiers D and F, respectively, and which have the address names of "Phil Moss" and "Neel Paris", respectively.

Next, in the example of the first address list illustrated in FIG. 5A, first address data which has identification information of an identifier G, which corresponds to Hanako Fuji, and which has contact information of "hanako@pub.com" is stored. Meanwhile, in the example of the second address list illustrated in FIG. 5A, no address data which has at least one of a duplicate of the address name or a duplicate of the contact information is stored.

In this case, the CPU 21 applies the rule 5 (step 208: N), and adds the first address data to the second address list. In the example of the third address list illustrated in FIG. 5C, the CPU 21 displays the first address data which has the identification information of the identifier G, which corresponds to Hanako Fuji, and which has the contact information of "hanako@pub.com".

Second Exemplary Embodiment

A second exemplary embodiment is different from the first exemplary embodiment in that if address duplicate data has a synchronization history (that is, if address duplicate data has been synchronized), other identification information different from (i) identification information of first address data and (ii) identification information of the address duplicate data is assigned. Detailed description will be given below.

A hardware configuration of an information processing apparatus 20 according to the present exemplary embodiment is the same as the configuration according to the first exemplary embodiment (see FIG. 1). Thus, description on the hardware configuration of the information processing apparatus 20 will be omitted.

With reference to FIGS. 6 and 7, an address database 23B and a group address database 23C according to the present exemplary embodiment will be described.

The address database 23B illustrated in FIG. 6 is different from the address database 23B illustrated in FIG. 2 in that no consolidation information is associated and stored. The group address database 23C illustrated in FIG. 7 is different from the group address database 23C illustrated in FIG. 3 in that no consolidation information is associated and stored.

Next, an operation of the information processing apparatus 20 according to the present exemplary embodiment will be described with reference to FIG. 8. In the information processing illustrated in FIG. 8, steps at which the same processes are performed as the information processing illustrated in FIG. 4 are assigned with the same step numbers as those in FIG. 4, and description thereof will be omitted.

Figure 8:
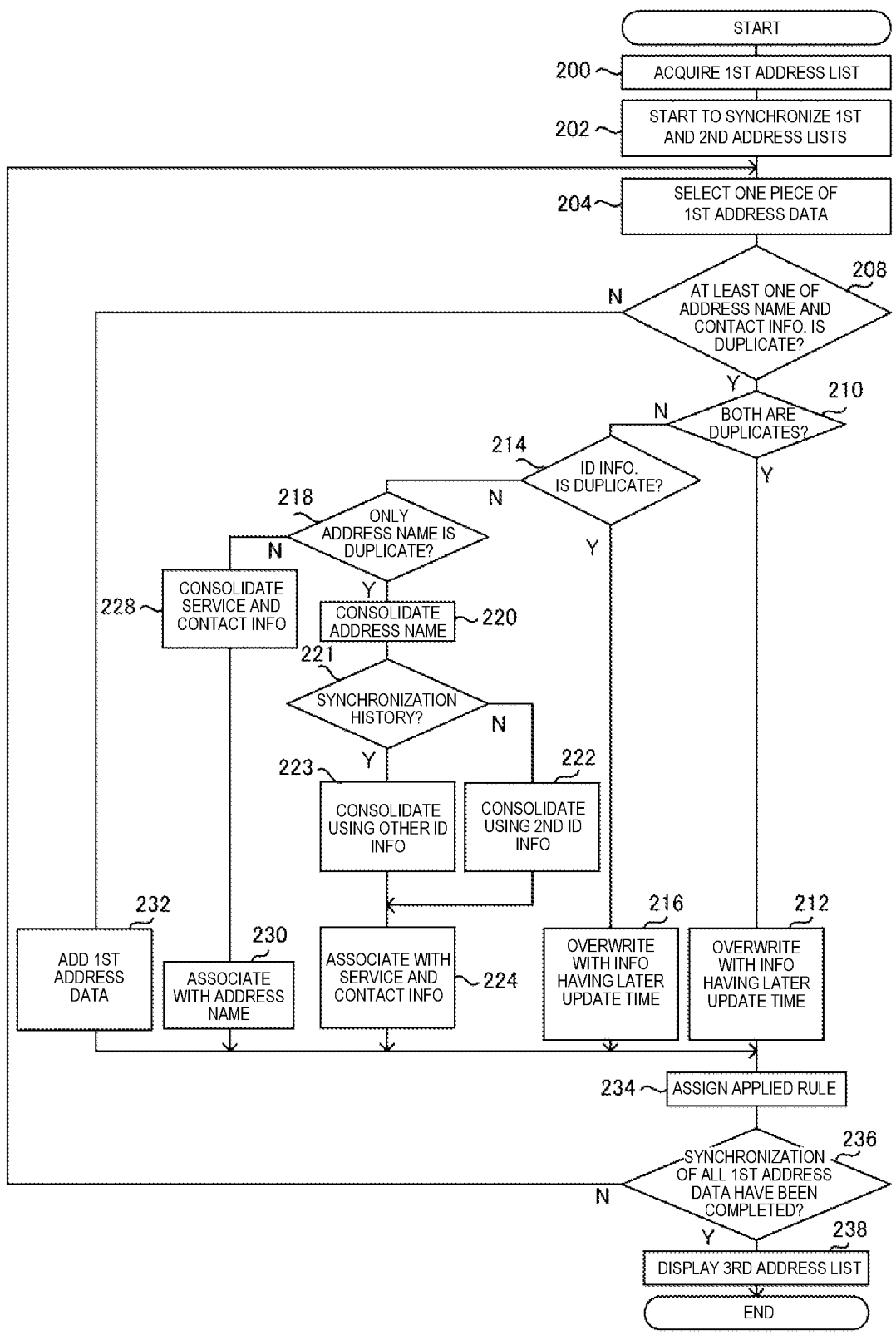
FIG. 8 is a flowchart of an example of information processing according to the second exemplary embodiment.

The information processing illustrated in FIG. 8 is different from the information processing illustrated in FIG. 4 in that processes at step 221 and step 223 are applied in place of the processes at step 206 and step 226.

In step 221 of FIG. 8, the CPU 21 determines whether there is address duplicate data having a synchronization history (that is, whether there is address duplicate date which has been synchronized). Specifically, the CPU 21 determines whether there is address duplicate data having any information in the applied rule. If an affirmative determination is made in the process in step 221, the CPU 21 proceeds to step 223. If a negative determination is made in the process in step 221, the CPU 21 proceeds to step 222.

In step 223, the CPU 21 consolidates the identification information using other identification information which is different from (i) identification information in the address duplicate data having the synchronization history and (ii) the first identification information. Specifically, the CPU 21 changes the identification information in the address duplicate data and the first identification information to the other identification information, and then consolidates the first identification information into the identification information in the address duplicate data.

In step 221, the CPU 21 may determine whether there is address duplicate data having any of the rules 1, 2, and 3 in the applied rule. In this case, only if there is a possibility that the address duplicate data has identification information that has been changed by performing synchronization with any of the external apparatuses before execution of the present information processing, the CPU 21 consolidates the identification information using the other identification information, which is different from (i) the identification information in the address duplicate data and (ii) the first identification information.

In the present exemplary embodiment, the CPU 21 may determine whether there is identification duplicate data having a synchronization history (that is, whether there is identification information that has been synchronized), after execution of step 216. In this case, if the CPU 21 makes an affirmative determination, the CPU 21 changes the identification information in the address data which has been overwritten in step 216 to other identification information different from the identification duplicate data. If the CPU 21 makes a negative determination, the CPU 21 does not perform any process.

Next, with reference to FIG. 9, the third address list will be specifically described. Here, it is assumed that the third address list is displayed using (i) a first address list which has not been synchronized with another address list before and (ii) a second address list which has a synchronization history (that is, which has been synchronized with another address list).

Next, in an example of the first address list illustrated in FIG. 9, first address data which has identification information of an identifier E, which corresponds to Jim Richardson who belongs to PRI Corp, and which has contact information of "JRichardson@pub.com" is stored. Meanwhile, in an example of the second address list illustrated in FIG. 9, address duplicate data which has identification information of an identifier C, which corresponds to Jim Richardson who belongs to PRI Corp, which has contact information of "JRichardson@pri.com", and which has a history of being synchronized using the rule 1.

In this case, since there is the address duplicate data having the synchronization history (Step 221: Y), the CPU 21 changes (i) the identifier C, which is the identification information in the address duplicate data, and (ii) the identifier E, which is the first identification information, to an identifier H, and then consolidate these identification information.

While the exemplary embodiments have been described, the technical scope of the present disclosure is not limited to the scope described in the exemplary embodiments. Various changes or modifications may be made to the exemplary embodiments without departing from the gist of the present disclosure, and the changed or modified exemplary embodiments still fall within the scope of the present disclosure.

The above-described exemplary embodiments do not limit claims. All combinations of the features described in the exemplary embodiments are not necessarily essential for implementing an aspect sought to be achieved by the present disclosure. The above-described exemplary embodiments includes inventions at various stages, and various inventions are extracted by combining plural disclosed elements. Even if some constituent requirements are removed from all constituent requirements illustrated in the exemplary embodiments, a configuration in which some constituent requirements have been removed may be extracted as the invention as long as the effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the information processing program 23A is installed in the storage 23. It is noted that the present disclosure is not limited to this configuration. The information processing program 23A according to the exemplary embodiments may be provided in a form that the information processing program 23A is stored in a computer readable storage medium. For example, the information processing program 23A according to the present exemplary embodiments may be provided in a form that the information processing program 23A is recorded on an optical disc (such as a Compact Disc ROM (CD-ROM) and a Digital Versatile Disc ROM (DVD-ROM)) or in a form that the information processing program 23A is recorded in a semiconductor memory (such as a Universal Serial Bus (USB)

memory and a memory card). The information processing program 23A according to the present exemplary embodiment may be acquired from an external apparatus via the communication I/F 28.

In the above exemplary embodiments, descriptions have been made on the examples where the information processing is implemented by a software configuration using a computer when a program is executed. It is noted that the present disclosure is not limited thereto. For example, the information processing may be implemented by a hardware configuration, or a combination of a hardware configuration and a software configuration.

The configuration of the information processing apparatus 20 described in the above exemplary embodiments is an example, and it is needless to say that an unnecessary part may be removed or a new part may be added if the result does not deviate from the gist of the present disclosure.

The flowcharts of the information processing program (see FIGS. 4 and 8) described in the exemplary embodiments are examples. It is needless to say that an unnecessary step may be omitted, a new step may be added, or the processing sequence may be changed if the result does not deviate from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable storage medium storing a program that causes a computer to execute information processing, the information processing comprising:
   acquiring a first address list stored in an external apparatus; and
   when synchronizing the acquired first address list and a second address list stored in an own apparatus, displaying a third address list in which information duplicated between the first address list and the second address list have been consolidated, wherein
   when at least one of (i) an address name representing a name of an address or (ii) contact information that is used to contact the address name is duplicate between the first address list and the second address list, one of the duplicate information of the first address list and the duplicate information of the second address list is overwritten with the other of the duplicate information of the first address list and the duplicate information of the second address list, and the third address list is displayed in which the one of the duplicate information of the first address list and the duplicate information of the second address list has been overwritten, and
   the third address list is displayed in which information having a later update time among the duplicate information of the first address list and the duplicate information of the second address list has been overwritten with information having an earlier update time among the duplicate information of the first address list and the duplicate information of the among the duplicate information of the first address list and the duplicate information of the second address list.

2. The non-transitory computer readable storage medium according to claim 1, wherein
   if (i) the address name representing the name of the address is duplicated between the first address list and the second address list, and (ii) the first address list and the second address list have different contact information that are used to contact the address name, the third address list is displayed in which the address name has been consolidated.

3. The non-transitory computer readable storage medium according to claim 2, wherein
   the third address list is displayed in which the consolidated address name has been associated with the respective different contact information.

4. The non-transitory computer readable storage medium according to claim 3, wherein
   if (i) the first address list and the second address list have different address names that represent names of addresses and (ii) the contact information that is used to contact the address names is duplicated between the first address list and the second address list, the third address list is displayed in which the contact information is consolidated.

5. The non-transitory computer readable storage medium according to claim 2, wherein
   if (i) the first address list and the second address list have different address names that represent names of addresses and (ii) the contact information that is used to contact the address names is duplicated between the first address list and the second address list, the third address list is displayed in which the contact information is consolidated.

6. The non-transitory computer readable storage medium according to claim 1, wherein
   if (i) the first address list and the second address list have different address names that represent names of addresses and (ii) the contact information that is used to contact the address names is duplicated between the first address list and the second address list, the third address list is displayed in which the contact information is consolidated.

7. The non-transitory computer readable storage medium according to claim 6, wherein
   the third address list is displayed in which the consolidated contact information has been associated with the different address names, respectively.

8. The non-transitory computer readable storage medium according to claim 1, wherein
   if (i) the address name representing the name of the address is duplicated between the first address list and the second address list and (ii) identification information associated with the address name is not duplicated between the first address list and the second address list, the third address list is displayed in which the identification information has been consolidated.

9. The non-transitory computer readable storage medium according to claim 8, wherein
   the identification information is consolidated (i) by assigning another identification information that is different from (a) the identification information of the first address list and (b) the identification information of the second address list or (ii) using the identification information of the first address list or the identification information of the second address list.

\* \* \* \* \*